Feb. 6, 1968    H. D. SAVAGE, JR    3,367,259
AIR MIXING APPARATUS
Filed Dec. 6, 1965
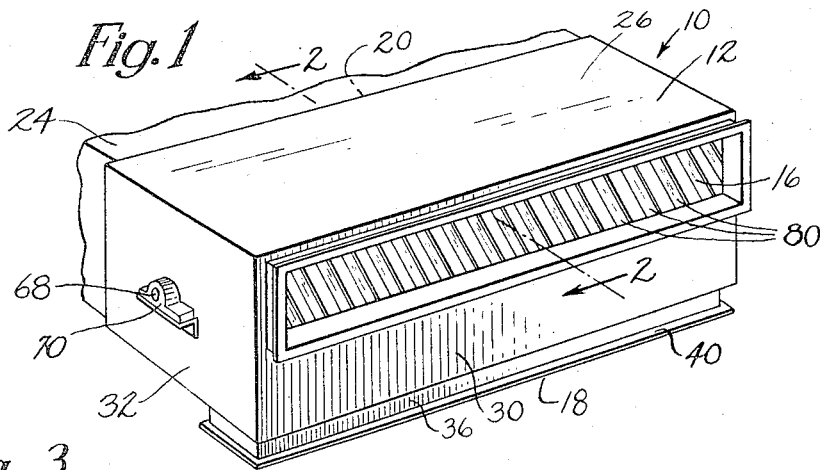
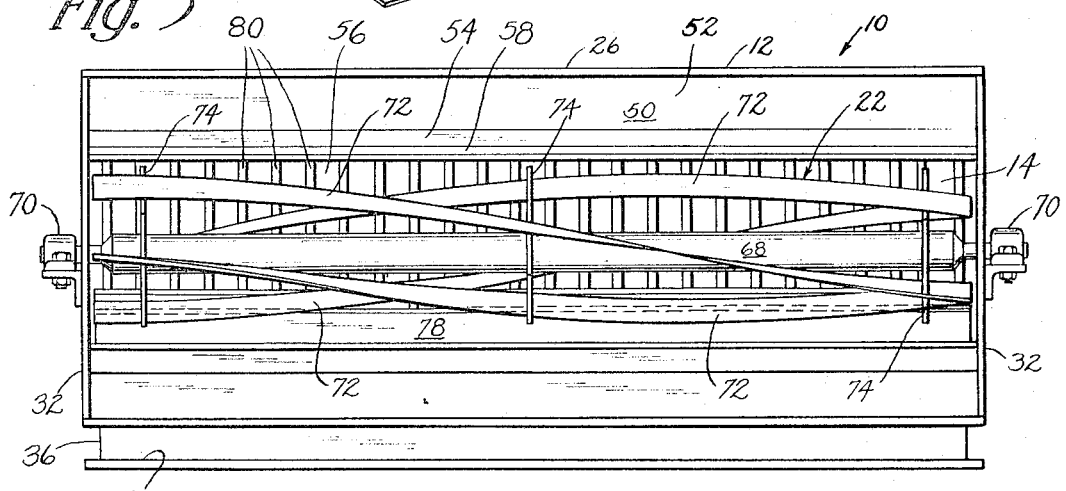
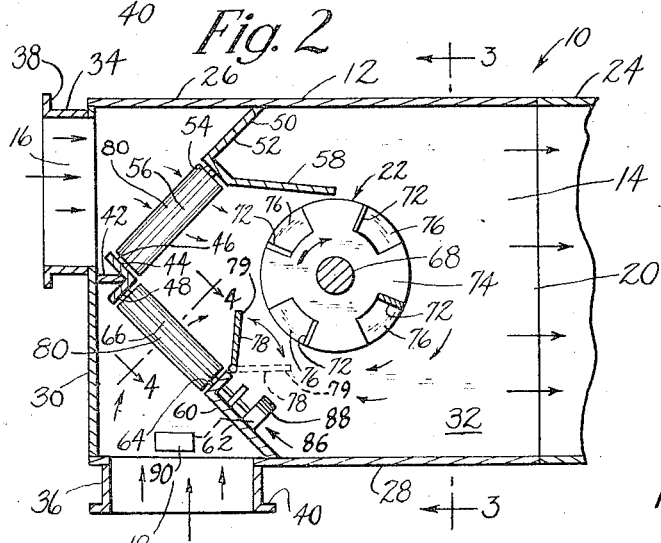
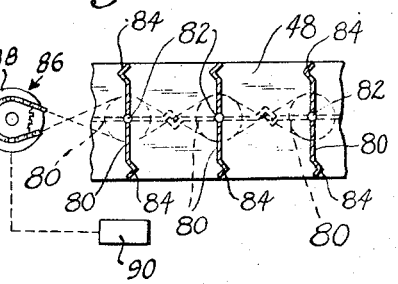
INVENTOR.
Harlow D. Savage Jr.
BY
McCormick, Paulding & Huber
ATTORNEYS United States Patent Office 3,367,259
Patented Feb. 6, 1968

3,367,259
AIR MIXING APPARATUS
Harlow D. Savage, Jr., 20 Westmont St.,
West Hartford, Conn. 06117
Filed Dec. 6, 1965, Ser. No. 511,864
11 Claims. (Cl. 98—38)

This invention relates to air distribution systems and deals more particularly with air mixing apparatus therefor.

The general object of the invention is to provide an apparatus for mixing air received from different sources at different temperatures for an air distribution system so as to avoid temperature stratification and to provide a substantially uniform temperature of the mixed air before introduction to the distribution system.

Other objects and advantages of the invention will be apparent from the following description and from the drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a perspective view of an air mixing apparatus embodying the present invention, the apparatus being shown connected to an air intake duct for an air distribution system.

FIG. 2 is a somewhat enlarged vertical sectional view of the apparatus of FIG. 1, taken along the line 2—2 of FIG. 1.

FIG. 3 is a vertical sectional view taken along the line 3—3 of FIG. 2.

FIG. 4 is a somewhat enlarged sectional view taken along the line 4—4 of FIG. 2.

Referring particularly to FIGS. 1 and 2 of the drawing, an air mixing apparatus embodying the invention is illustrated and designated generally by the reference numeral 10. The apparatus 10 generally comprises a hollow housing 12 which has a mixing chamber 14. At least two inlet openings 16 and 18 in the housing communicate with the mixing chamber for receiving air from different sources at different temperatures. An outlet opening 20 communicates between the mixing chamber 14 and an air distribution system which induces a flow of air through the apparatus and into which the air mixed by the apparatus is introduced. Mixing is effected by a rotor 22 which is journalled to rotate freely within the housing 12 about an axis extending transversely of the path of air flow in response to a flow of air therethrough and which includes blade means arranged in the path of air flow from either and both of the inlet openings. In FIG. 1 the apparatus 10 is shown to be connected at the outlet opening 20 to a casing 24 which may, for example, be an intake ventilating duct for a building or the inlet to a room air conditioning system.

The housing 10 is characterized by thin walls and a generally elongated rectangular shape and is preferably fabricated from sheet metal suitably reinforced to resist the resonant effect of air movement therethrough. As shown, the housing includes a top wall 26, a bottom wall 28, a front wall 30 and a pair of end walls 32, 32. It will be noted that the rear of the housing 10 is left substantially open to form the outlet opening 20.

The inlet openings may vary in construction, shape and general arrangement, but preferably the inlet opening comprises substantially similar relatively short passageways 16 and 18 which are angularly spaced within 90° and which direct the incoming air into the mixing chamber 14. In the presently preferred embodiment of the invention a relatively short duct section 34 which has an elongated rectangular cross section generally longitudinally aligned with the housing extends outwardly from a complementary opening in the upper portion of the front 30 and partially defines the inlet passageway 16. In a like manner the inlet passageway 18 is partially defined by a generally similarly constructed and arranged duct section 36 which extends outwardly from the frontal portion of the bottom 28. To facilitate attachment of the apparatus to complementary duct sections or the like which may, for example, comprise part of an associated air distribution system the duct sections 34 and 36 each include an outwardly extending flange 38 and 40 which surrounds the outer or free end of the respectively associated duct section.

The air passageways 16 and 18 are further defined within the housing by a plurality of partitions which extend longitudinally between the housing end walls 32, 32 and which are best shown in FIG. 2. A common dividing wall between the two passageways is provided by a first partition 42 which extends rearwardly from the central portion of the front wall 30. Supported by the first partition 42 is a generally V-shaped forwardly opening second partition 44 which is joined at its vertex with the longitudinally extending rear or free edge of the first partition. The second partition includes an upper wall 46 and a lower wall 48 each of which are inclined at about a 45° angle to the first partition 42. The walls 46 and 48 serve to partially define the respectively associated passageways 16 and 18 at the mixing chamber ends thereof.

The passageway 16 is further defined at the mixing chamber end by a third partition 50 which includes a first portion 52 which is inclined generally downwardly and forwardly at about a 45° angle from the top wall 26 and a second portion or wall 54 which is bent generally rearwardly into parallel alignment with the upper wall 46. At this point it should be noted that the upper wall 46, the wall 54 and portions of the end walls 32, 32 associated therewith form an elongated generally longitudinally extending slot 56 which communicates between the passageway 16 and the mixing chamber 14.

To direct the flow of air from at least one of the passageways toward the rotor 22 to be hereinafter further described at least one baffle plate is provided. It is for this purpose that the partition 50 includes a third portion or baffle plate 58 which extends for some distance from the wall 54 generally rearwardly or toward the circumferential edge of the rotor 22 as shown in FIG. 2.

A means further defining the passageway 18 is provided by a fourth partition 60 which has a first portion 62 inclined generally forwardly and upwardly at about a 45° angle from the bottom wall 28 proximate the rear of the inlet opening 18. A second portion or wall 64 of the partition 60 is bent generally rearwardly into parallel alignment with the lower wall 48. Thus, the wall 64 the lower wall 48 and portions of the end walls 32, 32 associated therewith form an inlet opening or slot 66 which is in longitudinal parallel alignment with and generally similar to the slot 56. It will be observed that like the passageways 16 and 18, the respectively associated slots 56 and 66 are angularly spaced within 90°.

Turning now to the construction of the rotor 22 with particular reference to FIGS. 2 and 3, it will be seen that the rotor of the illustrated embodiment generally resembles a cutter wheel for a so-called reel type lawn mower. As shown, the rotor comprises a longitudinally extending shaft 68 having end portions of slightly reduced diameter. The end portions of the shaft 68 extend centrally through the end walls 32, 32 and are journaled in a pair of pillow blocks 70, 70 suitably fastened to the outer sides of the end walls to facilitate convenient lubrication and servicing.

As previously noted, the rotor 22 also includes a blade means which preferably comprises at least one vane which is helically twisted about the axis of the rotor. In the presently preferred embodiment of the invention, four elongated rectangular radially disposed generally axially extending vanes 72, 72 comprise the blade means. Each of the vanes is supported in radially spaced relation to the shaft 68 and in a helically twisted position relative thereto. Preferably, each vane is twisted through less than one convolution throughout its length. Support for the vanes is provided by three circular discs or hubs 74, 74 coaxially received upon the shaft 68 and axially spaced therealong to support each of the vanes at its midportion and near its end portions. Each of the hubs has four circumaxially spaced notches 76, 76 each of which receives a respectively associated vane. The notches in adjacent hubs are angularly positioned each with respect to the other so that the vanes are supported therein in the helically twisted position aforedescribed. The rotor may be made from various materials, but preferably and as shown it is made of metal and is secured in assembly by welding or by conventional fastener means.

To alter the flow of air into the mixing chamber 14, an adjustable baffle means is provided which is operably associated with at least one of the inlet openings.

In the illustrated embodiment the adjustable baffle means comprises an elongated generally rectangular baffle plate 78 having an axially extending free edge portion 79 disposed proximate the periphery of the rotor 22. The baffle plate 78 is disposed between the slot 66 and the rotor 22 and is secured for pivotal movement about the upper or longitudinally extending free edge of the partition 60.

The baffle plate 78 is pivotally movable through a range of positions between a first position indicated by the solid lines in FIG. 2 and a second position indicated by broken lines. It will be observed that the baffle exerts a maximal effect upon the path of air flow when it is adjusted to the first position. Thus, when the baffle plate 78 is adjusted to the latter position the air which flows into the mixing chamber through the slot 66 tends to flow generally toward the upper or frontal portion of the slot or generally away from the rotor 22. Conversely, when the movable baffle plate 78 is pivoted in a clockwise direction to the second position it has a minimal effect upon the path of air flow from the associated slot. It should be apparent that the various positions of the baffle effect various alterations of the air flow path. Since the angle of incidence of air flow relative to the rotor 22 is determined by the position of the adjustable baffle, it should be evident that the position of the baffle effects the rotational speed of the rotor.

The baffle may be arranged for automatic or manual adjustment but preferably it is arranged to be manually adjusted.

For regulating the relative amount of air received by the mixing chamber from the inlet openings, a damper means is provided which is operatively associated with at least one of the inlet openings. Preferably, both inlet openings are provided with damper means for adjustably restricting and closing the associated openings.

Referring now to FIGS. 2 and 4, a damper means associated with the slot 66 is shown to comprise a longitudinally spaced series of rectangular fins 80, 80 which extend transversely of the slot 66. Each of the fins 80, 80 is pivotal about a transverse central axis or pivot pin 82, 82 the end portions of which are received by associated slot walls 48 and 64. Adjacent fins are arranged for simultaneous pivotal movement in opposite or clockwise and counterclockwise directions between a first or fully open position wherein the surfaces thereof are in substantially parallel alignment as indicated by the full line position of FIG. 4 and a second or closed position, indicated by broken lines, wherein the said fins cooperate to form a substantially planar surface which serves to close the slot opening.

To provide an effective closure for the associated slot each of the fins 80, 80 includes a pair of transversely extending marginal portions 84, 84 which are bent so as to overlap and interlock with the corresponding marginal portions of adjacent fins when the damper is moved to the closed position.

It is preferred that the apparatus be temperature responsive, therefore a means is provided for moving the damper means toward and away from the closed position in response to the temperature of air at a pre-selected point, as for example, a point in the path of air flow into the associated inlet opening. Such a means for moving the damper may, for example, comprise a pneumatic or electrically operated motor.

For the purpose of illustration a typical means for moving the damper means shown schematically at 86 generally comprises a motor such as 88 operatively associated with the fins 80, 80 and responsive to a temperature sensing means such as 90 located in the path of air flowing into the inlet opening 18.

The invention claimed is:

1. An apparatus for mixing air received from different sources for introduction to a distributing system which induces the flow of air, said apparatus comprising a housing defining a mixing chamber having at least two inlet openings and an outlet opening communicating with the system, and a rotor freely journaled by said housing between said inlet openings and said outlet opening for rotation about an axis extending transversely of the path of air flow from said inlet openings to said mixing chamber, said rotor being provided with blade means arranged in the path of air flow from either and both of said inlet openings to effect rotation of said rotor and by such rotation to effect mixing of air from said inlet openings in said chamber.

2. The combination defined in claim 1 wherein the said inlet openings are angularly spaced within 90°.

3. An apparatus for mixing air received from different sources for introduction to a distributing system which induces the flow of air as set forth in claim 1 and further characterized by at least one baffle plate associated with at least one of said inlet openings for directing the path of air flow therefrom generally toward the periphery of said rotor.

4. An apparatus for mixing air received from different sources for introduction to a distributing system which induces the flow of air as set forth in claim 1 wherein said rotor is axially elongated and said blade means comprise an angularly spaced series of radially outwardly spaced vanes, each of the said vanes being helically twisted about the axis of said rotor.

5. An air mixing apparatus as set forth in claim 1 wherein said rotor has at least one vane helically twisted about the axis thereof.

6. An air mixing apparatus as set forth in claim 1 including damper means operatively associated with at least one of the said inlet openings for adjustably restricting and closing said one opening to regulate the relative amount of air received by said mixing chamber therefrom.

7. The combination defined in claim 6 further characterized by means for moving said damper means toward and away from a closed position in response to the temperature of air at a pre-selected point.

8. The combination as defined in claim 6 wherein at least one of the said inlet openings includes an elongated slot, said damper means comprising a plurality of axially spaced generally rectangular fins extending transversely of said slot each of the said fins being pivotal about a transverse central axis with adjacent said fins being arranged to simultaneously pivot in opposite directions for adjustably restricting and closing said lot.

9. An air mixing apparatus as set forth in claim 1 including adjustable baffle means operatively associated with at least one of said inlet openings for directing the path of air flow from said one inlet opening respectively toward and away from the periphery of said rotor.

10. The combination defined in claim 9 wherein at least one of the said inlet openings includes an elongated axially extending slot and said adjustable baffle means comprises an elongated axially extending movable baffle associated with said slot, said baffle being disposed between said rotor and said slot and being arranged for pivotal movement about an axially extending axis, said baffle being movable toward and away from said slot.

11. An air mixing apparatus as set forth in claim 10 wherein said adjustable baffle further includes an axially extending free edge portion disposed proximate the periphery of said rotor.

References Cited

UNITED STATES PATENTS

| | | | |
|---|---|---|---|
| 2,884,846 | 5/1959 | Goodman et al. | 98—38 |
| 2,976,884 | 3/1961 | Kurth et al. | 98—38 X |
| 3,009,408 | 11/1961 | Bierwirth et al. | 98—38 |
| 3,180,245 | 4/1965 | Erickson et al. | 98—38 |
| 3,193,000 | 7/1965 | Bressoud | 98—38 X |

FOREIGN PATENTS 1,127,818   7/1955   France.

MEYER PERLIN, *Primary Examiner.*

ROBERT A. O'LEARY, *Examiner.*

W. E. WAYNER, *Assistant Examiner.*